(12) United States Patent
Hamza

(10) Patent No.: US 7,876,925 B2
(45) Date of Patent: Jan. 25, 2011

(54) RUNWAY SEGMENTATION USING VERTICES DETECTION

(75) Inventor: Rida M. Hamza, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 971 days.

(21) Appl. No.: 11/692,728

(22) Filed: Mar. 28, 2007

(65) Prior Publication Data

US 2008/0240498 A1    Oct. 2, 2008

(51) Int. Cl.
*G06K 9/00* (2006.01)
*G06G 7/70* (2006.01)

(52) U.S. Cl. .......................... 382/103; 382/199; 701/16

(58) Field of Classification Search ................. 382/100, 382/103, 106, 107, 155, 168, 177, 181, 191, 382/199, 202, 209, 214, 232, 254, 274, 276, 382/288–297, 312; 455/3.06; 701/16, 301; 73/170.13; 340/953; 244/3.17
See application file for complete search history.

(56) References Cited

U.S. PATENT DOCUMENTS

| | | | | |
|---|---|---|---|---|
| 5,719,567 A * | 2/1998 | Norris | ......................... | 340/953 |
| 5,762,292 A * | 6/1998 | Schweyer et al. | .......... | 244/3.17 |
| 5,979,234 A * | 11/1999 | Karlsen | ..................... | 73/170.13 |
| 6,606,563 B2 * | 8/2003 | Corcoran, III | ................ | 701/301 |
| 6,952,632 B2 * | 10/2005 | Robert et al. | .................. | 701/16 |
| 7,565,105 B1 * | 7/2009 | Fujisaki | ....................... | 455/3.06 |
| 2003/0225487 A1 | 12/2003 | Robert et al. | | |

OTHER PUBLICATIONS

Doehler, H.-U. et al. "Autonomous Infrared-Based Guidance System for Approach and Landing;" Bellingham, WA, USA; vol. 5424, 2004, pp. 140-147, XP040184993.*
Tuytelaars T. et al., "Noncombinatorial Detection of Regular Repetitions Under Perspective Skew;" IEEE Transactions On Pattern Analysis And Machine Intelligence, IEEE Service Center, Los Alamitos, CA, USA; vol. 25, No. 4, Apr. 1, 2003, pp. 418-432, XP011095878.
EP Search Report, 08103044.7-2218 dated Jul. 24, 2009.
Andrew, A.M.; "Another Efficient Algorithm For Convex Hulls In Two Dimensions," Information Processing Letters, Apr. 30, 1979, pp. 216-219, vol. 9, No. 5, Department of Cybernetics, University of Reading, Reading, England.
Harris, C., Stephens, M.; "A Combined Corner And Edge Detector,"1988, pp. 147-151, Plessey Research Roke Manor, United Kingdom.
Hamza, R.; "Enhanced Vision Systems Vertex Method Analysis," Advanced Vision Systems Program, Aug. 2007, pp. 1-13, Honeywell.

* cited by examiner

*Primary Examiner*—Seyed Azarian
(74) *Attorney, Agent, or Firm*—Ingrassia Fisher & Lorenz, P.C.

(57) ABSTRACT

Methods and apparatus are provided for locating a runway by detecting an object (or blob) within data representing a region of interest provided by a vision sensor. The vertices of the object are determined by finding points on the contour of the object nearest for the four corners of the region of interest. The runway can then be identified to the pilot of the aircraft by extending lines between the vertices to identify the location of the runway.

17 Claims, 7 Drawing Sheets

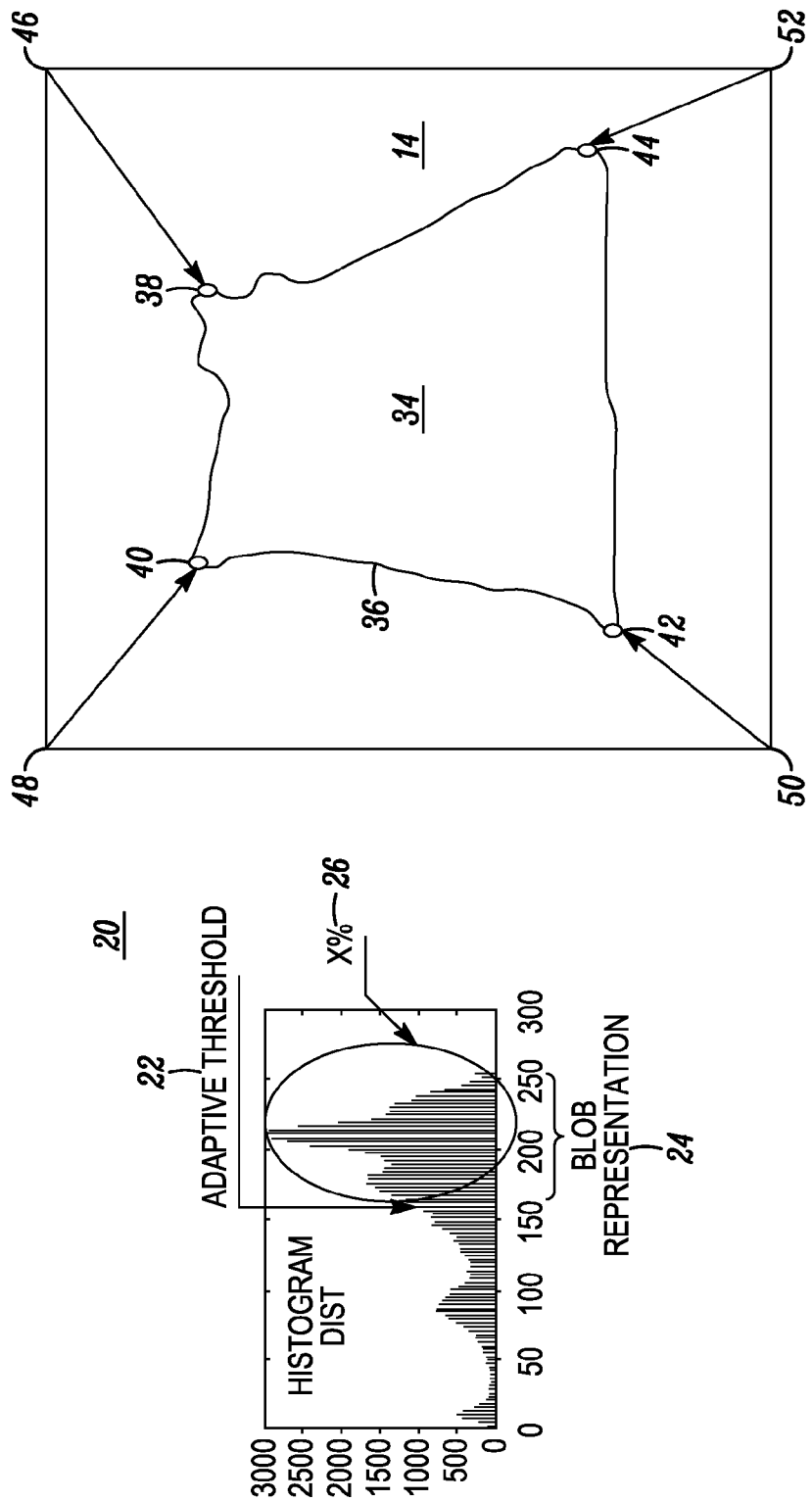

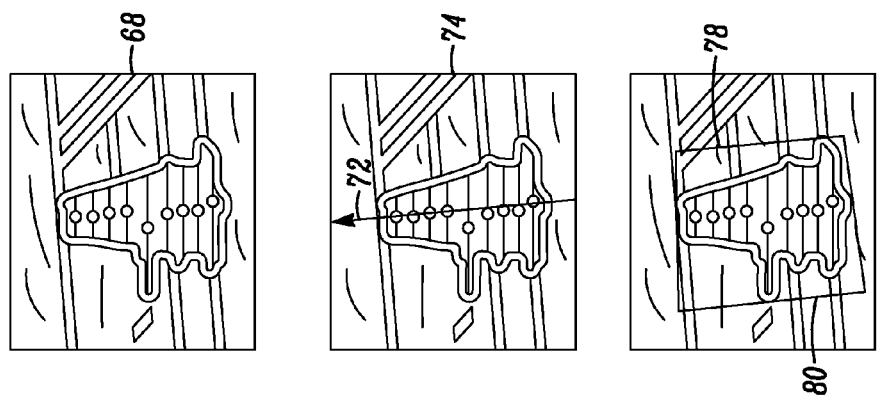
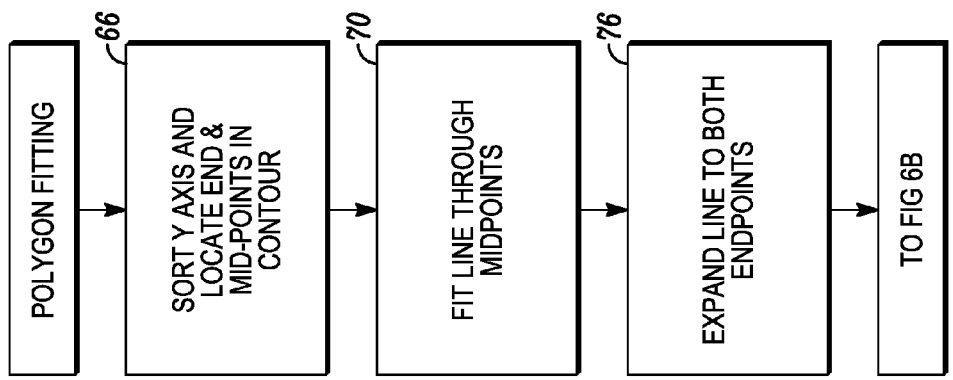
FIG. 6A

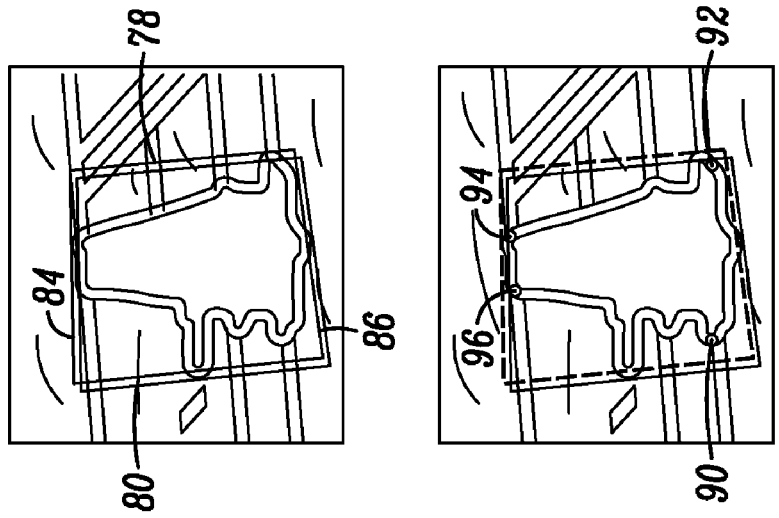
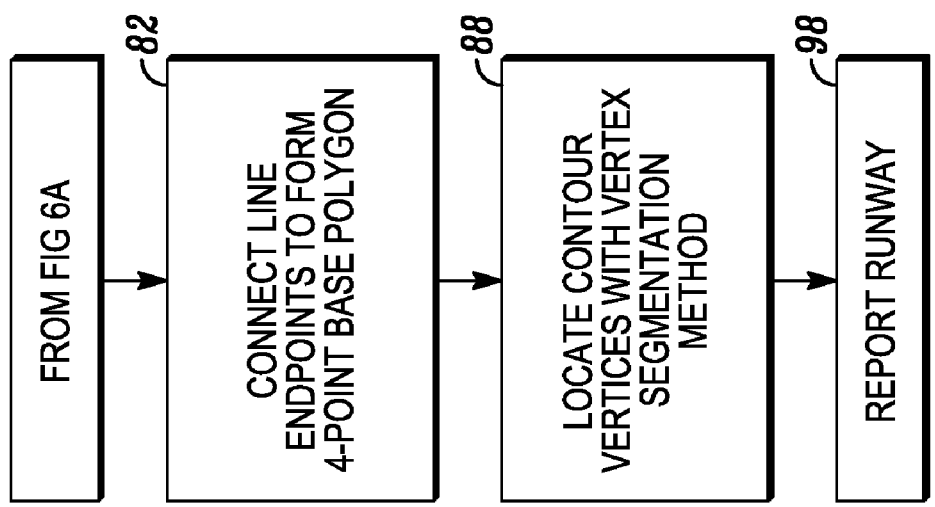
FIG. 6B under # US 7,876,925 B2

RUNWAY SEGMENTATION USING VERTICES DETECTION

FIELD OF THE INVENTION

The present invention generally relates to aircraft navigation and more particularly relates to aircraft navigation during landings in adverse weather conditions.

BACKGROUND OF THE INVENTION

The need to land aircraft in low or zero visibility conditions is an unfortunate but necessary event. Changing weather patterns, sudden storms or fog can quickly reduce or obscure a pilot's ability to make a visual landing. In such circumstances pilots may employ synthetic vision systems (SVS) to assist the pilot in locating the runway during landing. However, synthetic vision systems are only as accurate of the database of models that it uses to inform the pilot where the runway is located in a region of interest (ROI) provided by vision sensors. To improve runway location accuracy it is known to use a highly computational, brute force, method known as line fitting. In line fitting, each row and column of pixels from an image sensor are examined in order to attempt to locate straight lines that may be the edges of a runway. Due to the computational complexity of this approach, line fitting can be slow to process sensor data or slow to update the runway location during the final approach. Also, searching for straight lines using brute force edge detection can produce ambiguous results when attempting to resolve the location of the runway.

Accordingly, it is desirable to have a highly accurate yet computationally simple way to locate runways (or other substantially linear objects, e.g., flight decks) during landings in poor weather conditions. In addition, it is desirable to be able to rapidly update runway location throughout the aircraft's final approach at each frame with variable acceptance frame rate throughput. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for locating a runway by detecting an object within data representing a region of interest provided by a vision sensor. The vertices of the object are determined by finding points on the contour of the object nearest for the four corners of the region of interest. The runway can then be identified to the pilot of the aircraft by extending lines between the vertices to identify the location of the runway.

A method is provided for locating a runway by detecting an object within data representing a region of interest provided by a vision sensor. The vertices of the object are determined by finding points on the contour of the object nearest for the four corners of the region of interest. The runway can then be identified to the pilot of the aircraft by extending lines between the vertices to identify the location of the runway.

BRIEF DESCRIPTION OF THE DRAWINGS

The present invention will hereinafter be described in conjunction with the following drawing figures, wherein like numerals denote like elements.

FIG. 2 is an illustration of the adaptive threshold technique employed in the preferred embodiment of the present invention;

FIG. 3 is an illustration of the vertex segmentation technique employed in one preferred embodiment of the present invention;

FIG. 6A and FIG. 6B are flow diagrams and illustrations demonstrating the computational approach for the 4-Point Base Polygon fitting technique employed in another preferred embodiment of the present invention.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
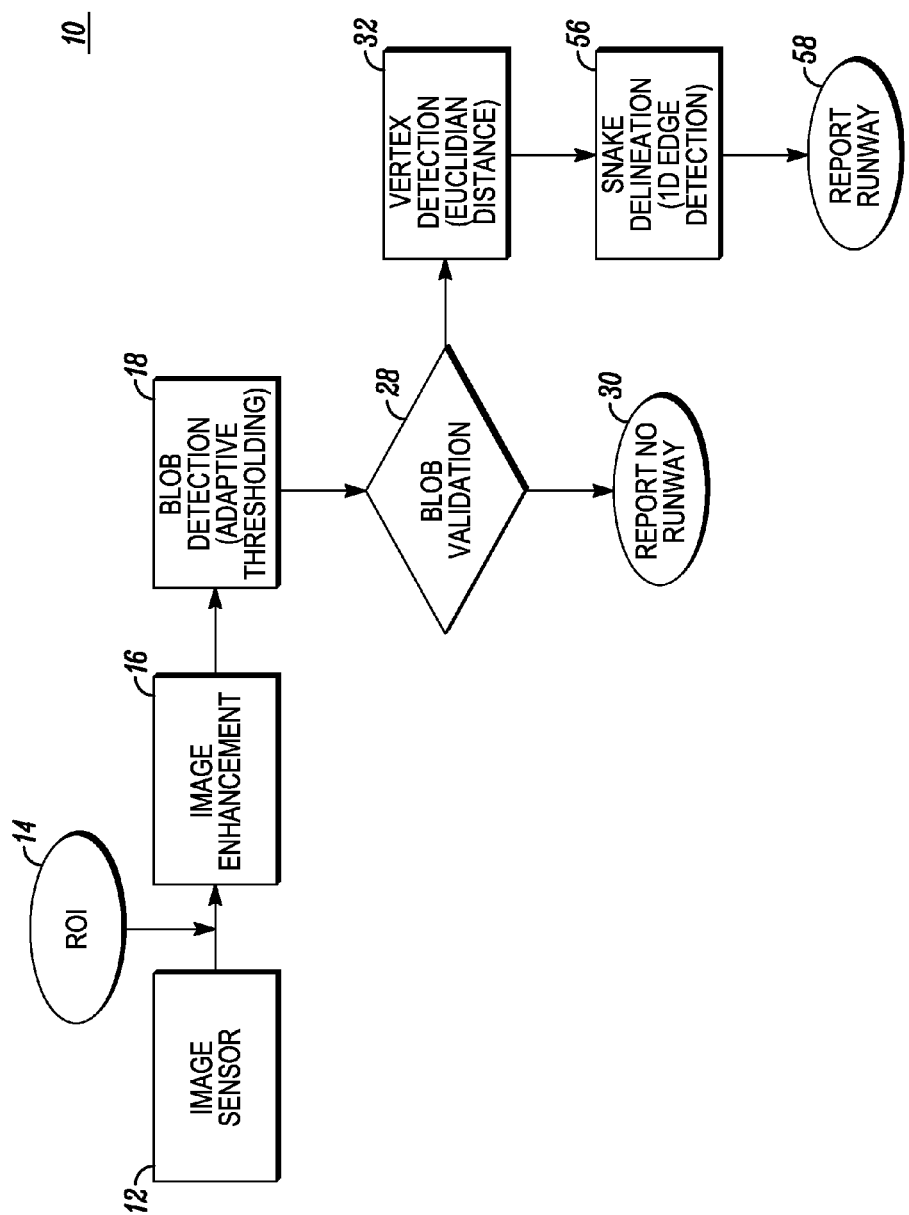
FIG. 1 is a block diagram of a runway location system in accordance with the present invention.

Referring to FIG. 1, the runway (or other substantially planer area, e.g., a flight deck) location system 10 in accordance with the present invention is shown. An image sensor 12, which generally with include an infra-red (IR), vision or some other suitable camera provides data representing a region of interest (ROI) 14 derived by synthetic data sets as an approximate estimate based upon a synthetic model stored within the sensor 12 or other convenient location. Within the region of interest, it is expected that runway can be identified from the sensor data supplied. To that end, the image sensor also provides confidence information or data representing the confidence value (for example, 80%) that the runway is within the region of interest. The data representing the ROI may be enhanced (for example to increase the contrast between the pixels in the data) in an image processor prior to locate an object within the region of interest that is commonly referred to by those skilled in the art as a "blob" within a binary image. According to the present invention, the binary image is generated using the adaptive threshold techniques as described according to the present invention using the confidence data provided by the image sensor.

Referring to FIG. 2, the adaptive threshold process can be understood by reference to the illustration 20, which depicts a histogram distribution of the data representing the ROI. In this example, the adaptive threshold 22 has been set to the indicated level based upon the confidence data provided by the image sensor 12. The object or blob 24 are those grouping of pixels in the histogram that make up a certain percentage 26 of the data above the adaptive threshold 22. The percentage 26 is determined from synthetic runway proportion estimates from data sets stored in the image sensor 12 or other convenient location. According to the preferred embodiment of the present invention, the blob or object is located within the ROI in this manner.

Returning now to FIG. 1, after the detector 18 locates a blob or object with the ROI, the detection is validated in a validation processor 28. The validation processor 28 may employ one or any combination of a number of validation techniques, however, the preferred embodiment of the present invention uses at least one of the following queries: Is the blob centered (or substantially centered) within the ROI; is the blob occupying a certain percentage of the ROI; whether the blob appears to be one blob or more than one blob; or certain contrast variations between the blob and the surrounding areas just adjacent to the blob. Failure to validate results in a report 30 of no runway within the ROI, thus, saving computational time if the blob cannot be validated. From this point another ROI could be received from the image sensor 12 and the process repeated. Assuming, however, that the blob was validated, the vertex segmentation processor performs vertex detection to locate the vertices of the object.

Referring now to FIG. 3, the basic approach to locating the vertices of the blob can be understood. As shown, an ROI 14 contains an object (or blob) 34 having a contour 36. Generally, the contour will have an irregular shape that complicates locating the vertices. According to the present invention, the vertex segmentation processor locates the points (38, 40, 42 and 44) on the contour 36 that are nearest to the four corners (46, 48, 50 and 52) of the ROI. These points on the contour are then defined to be the vertices of the object 34.

Figure 4:
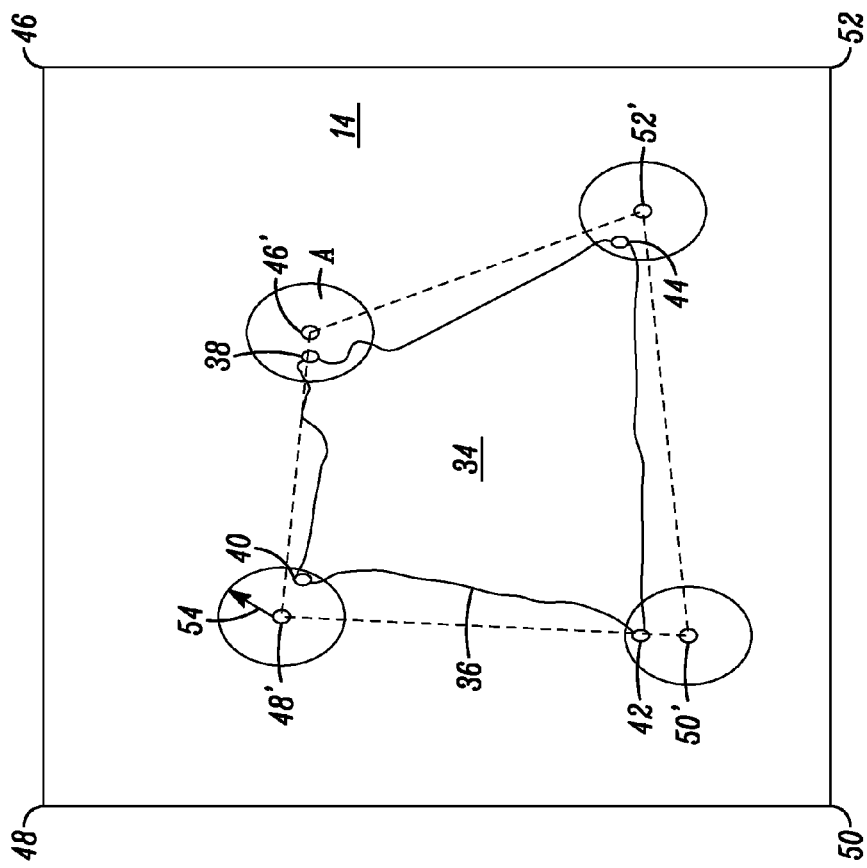
FIG. 4 is an illustration demonstrating the computational approach for vertex segmentation employed in one preferred embodiment of the present invention.

Referring now to FIG. 4, the preferred computation process to achieve vertex determination according to one preferred embodiment of the present invention can be explained. As before, the ROI 14 contains an object (or blob) 34 having a contour 36. The vertex segmentation processor solves the equation:

$$B(x_1,y_1)=\min \|B(x,y)-C(x_0,y_0)\|$$

$(x_1,y_1) \in (Rc(\lambda) \cap B)$ where B=detected blob contour and Rc($\lambda$)=circular region perimeter curve around the corner of the ROI, C($x_0,y_0$), based upon a margin radius $\lambda$.

As shown graphically in FIG. 4 one preferred embodiment begins searching at the corners (46, 48, 50 and 52) of the ROI looking for a point on the contour. To perform this localized search or computation, the present invention examines an area A defined by a radius $\lambda$ around each corner of the ROI. If no point on the contour 36 is found, the corner of the ROI is moved inward and the process repeats. Eventually, the offset corners (46', 48' 50' and 52') of the ROI find within the radius $\lambda$ a point (38, 40, 42 and 44) on the contour and the vertices are located. Lines may then be projected between the vertices to locate and identify the runway. Accordingly to the present invention, by having only to make these four localized computations, the speed of processing the ROI data is extremely reduced as compared to line fitting techniques used in the prior art.

Returning now to FIG. 1, after vertex detection 32, lines are projected between the vertices by a process known in the art as snake delineation 56. The runway can then be reported 58 to the pilots of the aircraft using conventional cockpit displays or a heads-up display system.

Figure 5:
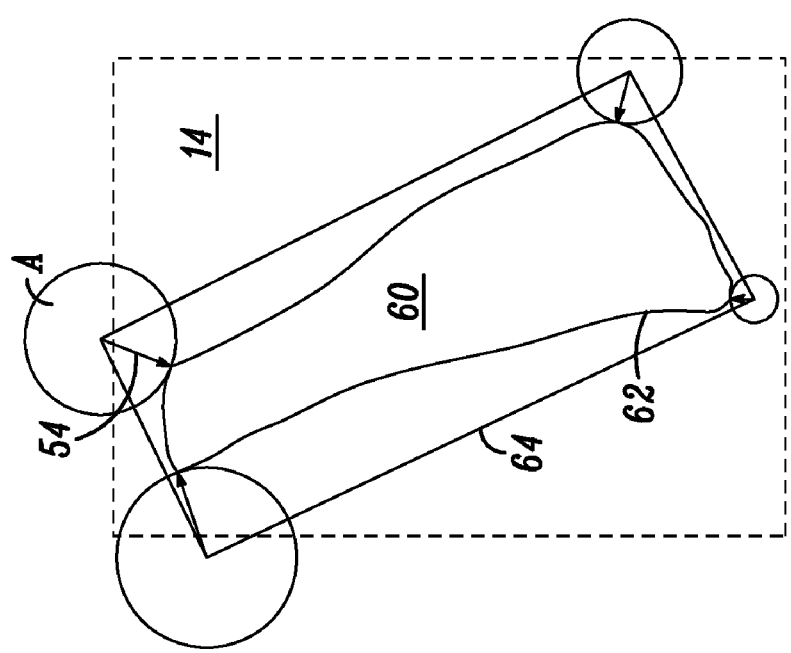
FIG. 5 is an illustration demonstrating the 4-Point Base Polygon fitting technique employed in another preferred embodiment of the present invention.

Referring now to FIG. 5, another preferred embodiment of the present invention for vertex segmentation can be understood. As before, an ROI 14 has a blob 60 located therein having a contour 62. As can be see, the blob is angled more sharply within the ROI than in FIG. 4, which may represent a pilot being out of line with the runway and approaching on an angle. According to this preferred embodiment, a four-point based polygon is first fit around the blob and then the vertex segmentation process begins for the corners of the four-point based polygon as opposed to the corners of the ROI. As shown in FIG. 5, a four-point polygon 64 has be fit around the blob 60 and an area A defined by the radius 54 is searched for a point on the contour 62. Once these points are located, the vertices can be defined.

FIG. 6A illustrates the process for fitting the four-point polygon around the blob. In step 66, the Y-axis of the blob are searched and the endpoints ($X_{min}$ and $X_{max}$) are identified along with the midpoint ($X_{mid}$). These points can be see in illustration 68. Next, step 70 extends a line 72 through the majority of the midpoints as seen in illustration 74. Step 76 expands the line 72 in both directions to the endpoints ($X_{min}$ and $X_{max}$) forming lines 78 and 80. Continuing now in FIG. 6B, the lines 78 and 80 are connected by lines 84 and 86 to form a four-point based polygon around the blob as was discussed in connection with FIG. 5. Step 88 the uses vertex segmentation to locate the vertices (90, 92, 94 and 96), and a runway can be reported 98 to the pilot.

Figure 7:
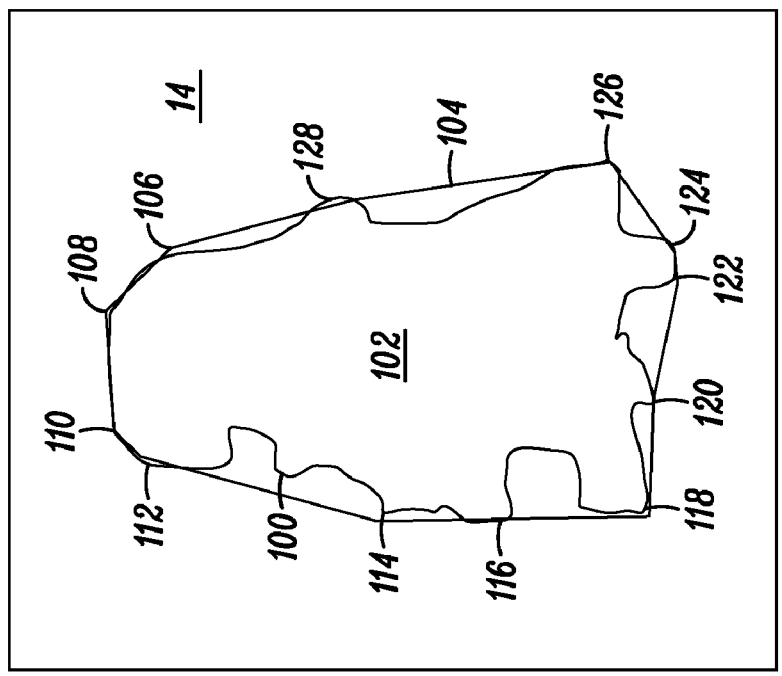
FIG. 7 is an illustration of an N-Point Base Polygon fitting technique employed in yet another preferred embodiment of the present invention.

Referring now to FIG. 7, yet another preferred embodiment to locate vertices on the contour 100 of a blob 100 within an ROI 14 is shown. Instead of fitting a four-point based polygon as is FIG. 6, this embodiment of the present invention fits an N-point based polygon 104 around that blob 102. As will be appreciated by those skilled in the art, within the N-points (106-128) will reside the best four point that are the vertices of a best fit four-point based polygon. To select the best four points of the N-points, this preferred embodiment of the present invention examines various groups of four points identified in a polygon corner list; approximating the N-polynomial contour to determine which group of four points contain the maximum area of the blob 102. When this determination is complete, the vertices are determined. While this preferred embodiment may use slightly more computational power, it is still much faster than prior line fitting techniques. Also, some computation time is saved as the steps for fit a four-point based polygon (see FIG. 6A and FIG. 6B) and then apply vertex segmentation are not required.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for locating a runway (or other substantially planer area), comprising the steps of:
    processing data representing a region of interest provided by a vision sensor using a processor and detecting an object having a contour within the data by processing the data with an adaptive threshold that is varied based upon information provided by the vision sensor;
    determining vertices of the object by locating points on the contour nearest each corner of the region of interest; and
    identifying the runway (or other substantially planer area) by extending lines between the vertices of the object.

2. The method of claim 1, wherein the determining step includes fitting a four-point base polygon around the object and the vertices of the object are points on the contour nearest the four corners of the four-point base polygon.

3. The method of claim 2, wherein fitting the four-point base polygon include the steps of:
    sorting Y-axis data from the object to locate endpoint and midpoints of horizontal lines through the object;
    fitting a line through the midpoints of the object;
    expanding the line to both endpoint of the object; and
    connecting endpoints of the lines to form a four-point based polygon.

4. The method of claim 1, wherein the runway is presented to pilots of an aircraft on a visual display.

5. The method of claim 1, which includes image enhancement on the data representing the region of interest.

6. The method of claim 1, which includes the step of validating the object prior to performing the determining step.

7. A method for locating a runway (or other substantially planer area), comprising the steps of:
processing data representing a region of interest provided by a vision sensor using a processor and detecting an object having a contour within the data;
determining vertices of the object by fitting an N-point base polygon around the object contour and approximating the N-polynomial contour by a 4-corner polygon having four polygon corners selected from the N-corners of the N-point base polygon such that the 4-corner polygon results in a maximized area coverage of the object residing within the 4-corner polygon; and
identifying the runway (or other substantially planer area) by extending lines between the vertices of the object.

8. A method for locating a runway (or other substantially planer area), comprising the steps of:
processing data representing a region of interest provided by a vision sensor using a processor and detecting an object having a contour within the data;
validating the object by at least one of the following group of validation techniques:
whether the object is substantially centered in the region of interest; whether the object occupies a certain area within the region of interest; weather there are more than one object in the region of interest; or whether there is sufficient contrast variation between the object and the surrounding data within the region of interest;
determining vertices of the object by locating points on the contour nearest each corner of the region of interest; and
identifying the runway (or other substantially planer area) by extending lines between the vertices of the object.

9. A system for locating a runway (or other substantially planer area), comprising:
a vision sensor capable of providing data representing a region of interest provided in which the runway may be located;
a detector for examining the data and identifying an object having a contour within the region of interest based upon contrast values and an adaptive threshold varied based upon information from the vision sensor;
a vertex segmentation processor capable of identifying vertices of the object by locating points on the contour nearest each corner of the region of interest; and
a display for presenting the location of the runway (or other substantially planer area) depicted as lines extending between the vertices of the object.

10. The system of claim 9, wherein the vertex segmentation processor is capable of aligning or fitting a four-point base polygon around the object and which computes the vertices of the object by locating points on the contour nearest the four corners of the four-point based polygon.

11. The system of claim 9, which includes a vision enhancement processor capable of increasing contrast in the data from the vision sensor.

12. The system of claim 9, which includes an object validation processor capable of determining that the runway is not present prior to the vertex segmentation processor having to operate.

13. A system for locating a runway (or other substantially planer area), comprising:
a vision sensor capable of providing data representing a region of interest provided in which the runway may be located;
a detector for examining the data and identifying an object having a contour within the region of interest based upon contrast values and an adaptive threshold;
a vertex segmentation processor is capable of aligning or fitting an N-point base polygon around the object and which computes the vertices of the object by locating four of the N-points on the contour that result in the maximum area of the object residing within the four points; and
a display for presenting the location of the runway (or other substantially planer area) depicted as lines extending between the vertices of the object.

14. A method for locating a runway (or other substantially planer area), comprising the steps of:
receiving data from a vision sensor representing a region of interest in which the runway may be located and confidence data representing the certainty (or uncertainty) of the vision sensor that the runway may be located in the region of interest;
processing the data in a processor and detecting an object having a contour within the region of interest by examining contrast variations in the data from an adaptive threshold that is set based upon the information from the vision sensor and scaling approximated from synthetic runway proportion estimates;
determining vertices of the object by locating points on the contour nearest each corner of the region of interest; and
identifying the runway (or other substantially planer area) by extending lines between the vertices of the object.

15. The method of claim 14, wherein the determining step includes fitting a four-point base polygon around the object and the vertices of the object are points on the contour nearest the four corners of the four-point base polygon.

16. The method of claim 15, wherein fitting the four-point base polygon include the steps of:
sorting Y-axis data from the object to locate endpoint and midpoints of horizontal lines through the object;
fitting a line through the midpoints of the object;
expanding the line to both endpoint of the object; and
connecting endpoints of the lines to form a four-point based polygon.

17. A method for locating a runway (or other substantially planer area), comprising the steps of:
receiving data from a vision sensor representing a region of interest in which the runway may be located and confidence data representing the certainty (or uncertainty) of the vision sensor that the runway may be located in the region of interest;
processing the data in a processor and detecting an object having a contour within the region of interest by examining contrast variations in the data from an adaptive threshold that is set based upon the information from the vision sensor and scaling approximated from synthetic runway proportion estimates;
determining vertices of the object by fitting an N-point base polygon around the object and the vertices of the object are four points selected on the contour that result in maximized area of the object residing within the four points; and
identifying the runway (or other substantially planer area) by extending lines between the vertices of the object.

* * * * *

UNITED STATES PATENT AND TRADEMARK OFFICE
CERTIFICATE OF CORRECTION

| | |
|---|---|
| PATENT NO. | : 7,876,925 B2 |
| APPLICATION NO. | : 11/692728 |
| DATED | : January 25, 2011 |
| INVENTOR(S) | : Rida M. Hamza |

It is certified that error appears in the above-identified patent and that said Letters Patent is hereby corrected as shown below:

Column 5, line 26, "weather" should be changed to --whether--.

Signed and Sealed this
Thirtieth Day of August, 2011

David J. Kappos
*Director of the United States Patent and Trademark Office*